US008762362B1

(12) United States Patent
Sathe et al.

(10) Patent No.: US 8,762,362 B1
(45) Date of Patent: Jun. 24, 2014

(54) SYSTEM AND METHOD FOR UPDATING A DATA STRUCTURE

(75) Inventors: Satish Sathe, San Ramon, CA (US); Rajendra Marulkar, Pune (IN); Sagar Vaishampayan, Pune (IN)

(73) Assignee: Applied Micro Circuits Corporation, Sunnyvale, CA (US)

( * ) Notice: Subject to any disclaimer, the term of this patent is extended or adjusted under 35 U.S.C. 154(b) by 139 days.

(21) Appl. No.: 13/278,701

(22) Filed: Oct. 21, 2011

(51) Int. Cl.
*G06F 17/30* (2006.01)

(52) U.S. Cl.
USPC .......................................... 707/706

(58) Field of Classification Search
None
See application file for complete search history.

(56) References Cited

U.S. PATENT DOCUMENTS

| 6,138,123 | A | * | 10/2000 | Rathbun ................................ 1/1 |
| 2005/0216770 | A1 | * | 9/2005 | Rowett et al. ................. 713/201 |
| 2007/0112795 | A1 | * | 5/2007 | Travison et al. .............. 707/100 |
| 2010/0023727 | A1 | * | 1/2010 | Lim ............................. 711/216 |
| 2010/0287512 | A1 | * | 11/2010 | Gan et al. ..................... 715/854 |
| 2012/0143876 | A1 | * | 6/2012 | Srinivasan et al. ........... 707/747 |

* cited by examiner

*Primary Examiner* — Rehana Perveen
*Assistant Examiner* — Alexander Khong
(74) *Attorney, Agent, or Firm* — Amin, Turocy & Watson, LLP

(57) ABSTRACT

System and method for updating a data structure are disclosed. In one embodiment, the method includes providing a data structure that includes a hierarchically arranged set of nodes and branches, and each node has two or less branches, retrieving a first data entry in the data structure via a first node in response to a first data access request, modifying the data structure to generate a first intermediate data structure that keeps the first node and creates a duplicate of the first node, and retrieving a second data entry in the data structure via the duplicate of first node in response to a second data access request. By maintaining at least the first node or a duplicate of the first node during a rebalancing operation of the data structure, the disclosed method supports accessing data entries associated with the first node during the rebalancing operation and therefore improves system performance.

23 Claims, 9 Drawing Sheets

| | | | | | | | | | |
|---|---|---|---|---|---|---|---|---|---|
| | | | | | | | | EQ,XXXX0xFFFF,E3) J(6,0,P-18) | |
| | | | | | | | EQ(0,0xXXXX0xFFFF,0) J(31,1,0) | EQ,XXXX0xFFFF,E3) J(5,3,P+2) | EQ,0x8,0xF0FF,0) J(7,0,P+32) |
| | | | | EQ(0,0xXXXX0xFFFF,0) J(31,1,0) | | | | | |
| | | | EQ,(0,0x800,0,0) J(4,0,P+2) | EQ(0,0x06,F0,0) J(5,0,P+4) | EQ,XXXX0xFFFF,E3) J(5,2,P+2) | EQ,0x6,0xF0FF,0) J(7,0,P+24) | EQ,XXXX0xFFFF,E3) J(8,1,P+0) | EQ,0x7,0xF0FF,0) J(7,0,P+28) | |
| EQ(0,0xA0,0,0) J(1,0,P+2) | EQ,(0xA1,0,0) J(2,0,P+2) | EQ,(0xA2,0,0) J(3,0,P+8) | EQ,(0x810Q,0,0) J(3,0,P+4) | EQ,XXXX0xFFFF,E1) J(4,1,P+8) | EQ,XXXX0xFFFF,E3) J(5,1,P+2) | EQ,0x5,0xF0FF,0) J(7,0,P+20) | EQ,XXXX0xFFFF,E3) J(7,1,P+2) | Key Node | |
| Addr0 | Addr1 | Addr2 | Addr3 | Addr4 | Addr5 | Addr6 | Addr7 | Addr8 | |

Figure 2

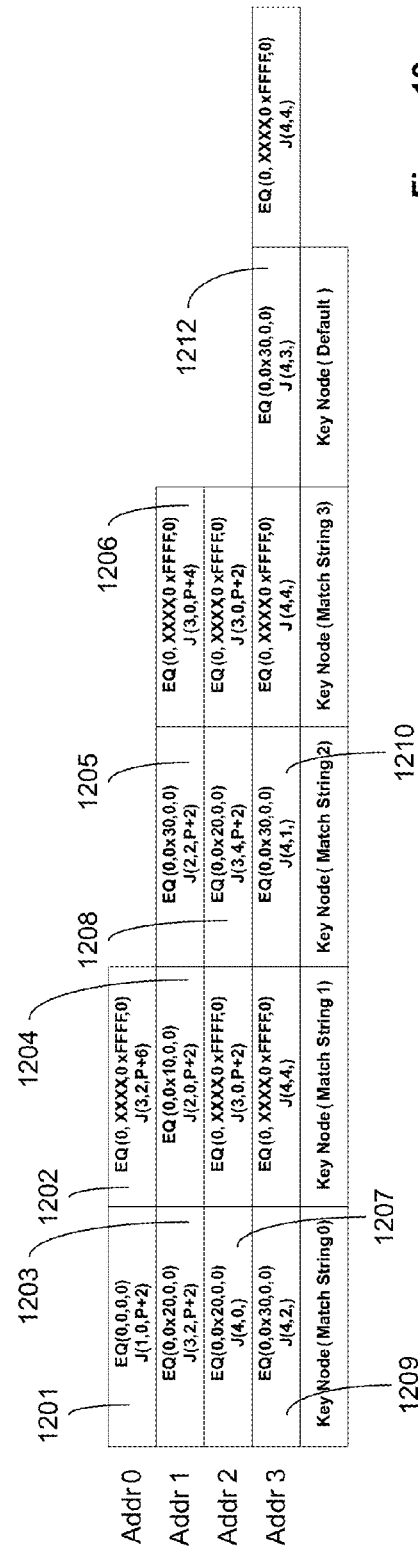

SYSTEM AND METHOD FOR UPDATING A DATA STRUCTURE

RELATED APPLICATION

This application is related to the following applications, each of which is filed on the same date as this application and is hereby incorporated by reference in its entirety: System and Method for Controlling Updates of a Data Structure, application Ser. No. 13/178,753 filed on Oct. 21, 2011; and System and Method for Searching a Data Structure, application Ser. No. 13/278,785 filed on Oct. 21, 2011.

FIELD

The present disclosure relates to the field of maintaining and accessing data structures. In particular, the present disclosure relates to system and method for updating a data structure.

BACKGROUND

There are numerous conventional data structures utilized in maintaining and searching data for varies applications. For example, a binary search tree (BST), which is also referred to as an ordered or sorted binary tree, is a node-based binary tree data structure. In a binary search tree, the left subtree of a node contains only nodes with values (keys) less than the node's value (key); the right subtree of a node contains only nodes with values greater than the node's value; and both the left and right subtrees are also binary search trees. Generally, the information represented by each node is a record rather than a single data element. However, for sequencing purposes, nodes are compared according to their values (keys) rather than any part of their associated records. Another example is a red-black tree, which is a type of self-balancing binary search tree, used to implement associative arrays. The red-black tree is also referred to as symmetry binary B-tree. It can perform search, insert, and delete in O(log n) time, where n is total number of elements in the tree. In other words, a red-black tree is a binary search tree that inserts and deletes in such a way that the tree is always reasonably balanced. Yet another example is an AVL tree, which is a self-balancing binary search tree. In an AVL tree, the heights of the two child subtrees of any node differ by at most by one. Lookup, insertion, and deletion of a node of the AVL tree take O(log n) time in both the average and worst cases, where n is the number of nodes in the tree prior to the operation. Insertions and deletions may require the tree to be rebalanced by one or more tree rotations. For an AVL tree, the balance factor of a node is the height of its left subtree minus the height of its right subtree (or vice versa) and a node with balance factor 1, 0, or −1 is considered balanced. A node with any other balance factor is considered unbalanced and requires rebalancing the tree.

One of the drawbacks of the conventional data structures is that they employ an automatic tree balancing algorithm that when one branch of a node in the tree has more than one level than the other branch of the node. This can cause many unnecessary rebalancing operations even though the data structure meets certain performance requirements prior to the rebalancing operation. Such unnecessary rebalancing operations can have adverse impact to the performance of the system. Another drawback of the conventional data structures is that during the rebalancing operations, the data structures are unable to service data access requests until the arrangement of nodes in the search trees have been completed. This temporary pause during the rebalancing operations can also adversely affect the performance of the system.

With the above conventional data structures, parts of the data may be stored in an on-chip cache memory and other parts of the data may be stored in an external memory. Typically, the time required to access data from external memory is significantly longer than the time required to access data from an on-chip cache memory. As data being added or removed, their corresponding nodes are added and removed from the data structure. As a node is removed from a data structure, its sub-branches may also be removed from the data structure. A Bloom Filter is a common technique used to determine certain aspect of whether a data is still in the data structure or not.

In general, a Bloom Filter is a space-efficient probabilistic data structure that is used to test whether a data (an element) is a member of the data structure (a set). The Bloom Filter algorithm allows for false positives, but does not allow for false negatives. In other words, a query of the Bloom Filter can return that a data is "inside the data structure (set), which may be wrong because of possibility of false positive" or "definitely not in the data structure (set)". In the case of a false positive, it is considered that the data is either in the on-chip cache or in the external memory. But after the search, it would be determined that the data does not exist in the data structure, and time and computing resources can be lost in the search. With the Bloom Filter, data can be added to the data structure, but not removed from the data structure. One of the drawbacks of the Bloom Filter is that as more and more data are added to the data structure, the probability of false positive increases, which can adversely affect the performance of the system.

Therefore, there is a need for system and method that address the drawbacks of the conventional data structures and approaches.

SUMMARY

The present disclosure relates to systems and methods for updating a data structure. In one embodiment, the method includes providing a data structure that includes a hierarchically arranged set of nodes and branches, and each node has two or less branches, retrieving a first data entry in the data structure via a first node in response to a first data access request, modifying the data structure to generate a first intermediate data structure that keeps the first node and creates a duplicate of the first node, and retrieving a second data entry in the data structure via the duplicate of first node in response to a second data access request. By maintaining at least the first node or a duplicate of the first node during a rebalancing operation of the data structure, the disclosed method supports accessing data entries associated with the first node during the rebalancing operation and therefore improves system performance.

The method also includes retrieving a third data entry in the data structure via a second node in response to a third data access request, modifying the first intermediate data structure to generate a second intermediate data structure, where the second intermediate data structure creates a duplicate of the second node and replaces the first node with the duplicate of the second node, and retrieving a fourth data entry in the data structure via the duplicate of the second node in response to a fourth data access request. The method further includes modifying the second intermediate data structure to generate an updated data structure, where the updated data structure removes the second node and balances the data structure with respect to the duplicate of the second node, and storing the updated data structure in a memory. Similarly, by maintaining at least the second node or a duplicate of the second node during a rebalancing operation of the data structure, the disclosed method supports accessing data entries associated with the second node during the rebalancing operation and improves system performance as a result.

In another embodiment, a system for updating a data structure includes a memory for storing a data structure having a hierarchically arranged set of nodes and branches, and each node has two or less branches, a graphical-user-interface for viewing representations of the data structure on a display, a search engine includes at least a processor and control logic that further includes logic for retrieving a first data entry in the data structure via a first node in response to a first data access request, logic for modifying the data structure to generate a first intermediate data structure that keeps the first node and creates a duplicate of the first node, and logic for retrieving a second data entry in the data structure via the duplicate of first node in response to a second data access request.

The system also includes one or more parsers coupled to a parser RAM, where the one or more parsers are configured to read an incoming data stream and compares contents of the data stream with contents in a location of the parser RAM, one or more access control list (ACL) search engines coupled to an ACL RAM, where the one or more ACL search engines are configured to perform searches with ACL search strings, and one or more search engines coupled to an exact match RAM, where the one or more search engines are configured to maintain the data structure. The system further includes an exchange module coupled to the exact match RAM and an external memory, where the exchange module is configured to control entries of the data structure between the exact match RAM and the external memory, one or more hash functions configured to generate hash values of data entries in the data structure, and a bloom filter coupled to the one or more hash functions, where the bloom filter is configured to determine a data entry whether exist in the data structure.

In yet another embodiment, a computer program product for updating a data structure has a non-transitory medium for storing computer programs for execution by one or more computer systems, the computer program product includes code for providing a data structure having a hierarchically arranged set of nodes and branches, and each node has two or less branches, code for retrieving a first data entry in the data structure via a first node in response to a first data access request, code for modifying the data structure to generate a first intermediate data structure that keeps the first node and creates a duplicate of the first node, and code for retrieving a second data entry in the data structure via the duplicate of first node in response to a second data access request.

The computer program product also includes code for retrieving a third data entry in the data structure via a second node in response to a third data access request, code for modifying the first intermediate data structure to generate a second intermediate data structure, where the second intermediate data structure creates a duplicate of the second node and replaces the first node with the duplicate of the second node, and code for retrieving a fourth data entry in the data structure via the duplicate of the second node in response to a fourth data access request. The computer program product further includes code for modifying the second intermediate data structure to generate an updated data structure that removes the second node and balances the data structure with respect to the duplicate of the second node, and code for storing the updated data structure in a memory.

In yet another embodiment, a method of controlling updates of a data structure includes providing a data structure that includes a hierarchically arranged set of nodes and branches, and each node has two or less branches, recording a total number of nodes in the data structure, determining whether to update the data structure according to one or more triggering conditions, generating an updated data structure in response to the one or more triggering conditions, and storing the updated data structure in a memory. The method of recording a total number of nodes includes incrementing a count of the total number of nodes by one when a new node is added to the data structure, and decrementing a count of the total number of nodes by one when a node is removed from the data structure.

The method of determining whether to update the data structure includes determining a worst case number of accesses to locate a data entry in the data structure, and generating a trigger to update the data structure if the worst case number of accesses exceeds a first predetermined threshold value. The method of determining whether to update the data structure further includes determining a number of levels of nodes in the data structure, and generating a trigger to update the data structure if the number of levels of nodes in the data structure is larger than a logarithmic function of number of nodes in the data structure. The method of determining whether to update the data structure further includes counting a number of nodes visited from a root node when a new leaf node is added to the date structure, and generating a trigger to update the data structure if the number of nodes visited from the root node to the new leaf node exceeds a second predetermined threshold value. The method of determining whether to update the data structure further includes comparing number of levels in one branch of a node to number of levels in another branch of the node in the data structure, and generating a trigger to update the data structure if the number of levels in one branch of the node is two or more than the number of levels in another branch of the node.

In yet another embodiment, a computer program product for controlling updates of a data structure includes a non-transitory medium storing computer programs for execution by one or more computer systems. The computer program product also includes code for providing a data structure that includes a hierarchically arranged set of nodes and branches, and each node has two or less branches, code for recording a total number of nodes in the data structure, code for determining whether to update the data structure according to one or more triggering conditions, code for generating an updated data structure in response to the one or more triggering conditions, and code for storing the updated data structure in a memory.

In yet another embodiment, a system for controlling updates of a data structure includes a memory for storing the data structure, which includes a hierarchically arranged set of nodes and branches, and each node has two or less branches and a user interface for viewing representations of the data structure on a display. The system also includes at least a processor and control logic, where the processor and control logic further includes logic for providing a data structure, logic for recording a total number of nodes in the data structure, logic for determining whether to update the data structure according to one or more triggering conditions, logic for generating an updated data structure in response to the one or more triggering conditions, and logic for storing the updated data structure in the memory.

In yet another embodiment, a method for searching a data structure includes providing a data structure that includes a plurality of data entries stored in an external random access memory (RAM) and a portion of the data structure is stored in an internal cache memory, performing one or more hash functions on each entry of the data structure to generate an encoding that maps to a location in the external RAM, maintaining a count of encodings that map to the location in the external RAM, where a first portion of the count of encodings is stored in the internal cache memory and a second portion of the count of encodings is stored in the external RAM, receiving a search string, performing the one or more hash functions on the search string to generate an index to the count of encodings, and searching the data structure in accordance with the count of encodings stored in the internal cache memory and in the external RAM. The first portion of the count of encodings includes an indication of whether the second portion of the count of encodings is used, and the second portion of the count of encodings is an extension of the first portion of the count of encodings. In one implementation, the first portion of the count of encodings includes count values of 0, 1, and 2, and the second portion of the count of encodings includes count values of great than 2.

The method of maintaining a count of encodings includes if there is an indication the second portion of the count of encoding is not used, incrementing the first portion of the count in response to a different entry of the data structure that maps to the location in the external RAM, and decrementing the first portion of the count in response to an entry that maps to the location in the external RAM is removed from the data structure. The method of maintaining a count of encodings further includes if there is an indication the second portion of the count of encoding is used, incrementing the second portion of the count in response to a different entry of the data structure that maps to the location in the external RAM, and decrementing the second portion of the count in response to an entry that maps to the location in the external RAM is removed from the data structure.

The method further includes identifying a false positive access associated with an encoding of a non-existing entry in the data structure, creating a default missed entry to record the encoding, counting a number of missed entries associated with the encoding using the default missed entry, and generating an alert signal if the number of missed entries exceeds a predetermined threshold value. The method also includes creating an access control list entry for the non-existing entry, reconfiguring a bloom filter to indicate false positive accesses detected based on the non-existing entry, and programming a parser to control the non-existing entry.

In yet another embodiment, a system for searching a data structure includes a memory for storing the data structure that includes a hierarchically arranged set of nodes and branches, and each node has two or less branches and a user interface for viewing representations of the data structure on a display. The system further includes at least a processor and control logic, where the processor and control logic further includes logic for providing the data structure that includes a plurality of data entries stored in an external random access memory (RAM) and a portion of the data structure is stored in an internal cache memory, logic for performing one or more hash functions on each entry of the data structure to generate an encoding that maps to a location in the external RAM, logic for maintaining a count of encodings that map to the location in the external RAM, where a first portion of the count of encodings is stored in the internal cache memory and a second portion of the count of encodings is stored in the external RAM, logic for receiving a search string, logic for performing the one or more hash functions on the search string to generate an index to the count of encodings, and searching the data structure in accordance with the count of encodings stored in the internal cache memory and in the external RAM. The first portion of the count of encodings includes an indication of whether the second portion of the count of encodings is used, and the second portion of the count of encodings is an extension of the first portion of the count of encodings. In one implementation, the first portion of the count of encodings includes count values of 0, 1, and 2, and the second portion of the count of encodings includes count values of great than 2.

In yet another embodiment, a computer program product for searching a data structure includes a non-transitory medium storing computer programs for execution by one or more computer systems. The computer program product further includes code for providing a data structure that includes a plurality of data entries stored in an external random access memory (RAM) and a portion of the data structure is stored in an internal cache memory, code for performing one or more hash functions on each entry of the data structure to generate an encoding that maps to a location in the external RAM, code for maintaining a count of encodings that map to the location in the external RAM, where a first portion of the count of encodings is stored in the internal cache memory and a second portion of the count of encodings is stored in the external RAM, code for receiving a search string, code for performing the one or more hash functions on the search string to generate an index to the count of encodings, and code for searching the data structure in accordance with the count of encodings stored in the internal cache memory and in the external RAM.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 2 illustrates an exemplary data packet according to some aspects of the present disclosure.

FIG. 11 illustrates exemplary rules containing wildcards according to some aspects of the present disclosure.

FIG. 12 illustrates exemplary wildcard search entries using rules of FIG. 11 according to some aspects of the present disclosure.

DESCRIPTION OF EMBODIMENTS

The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
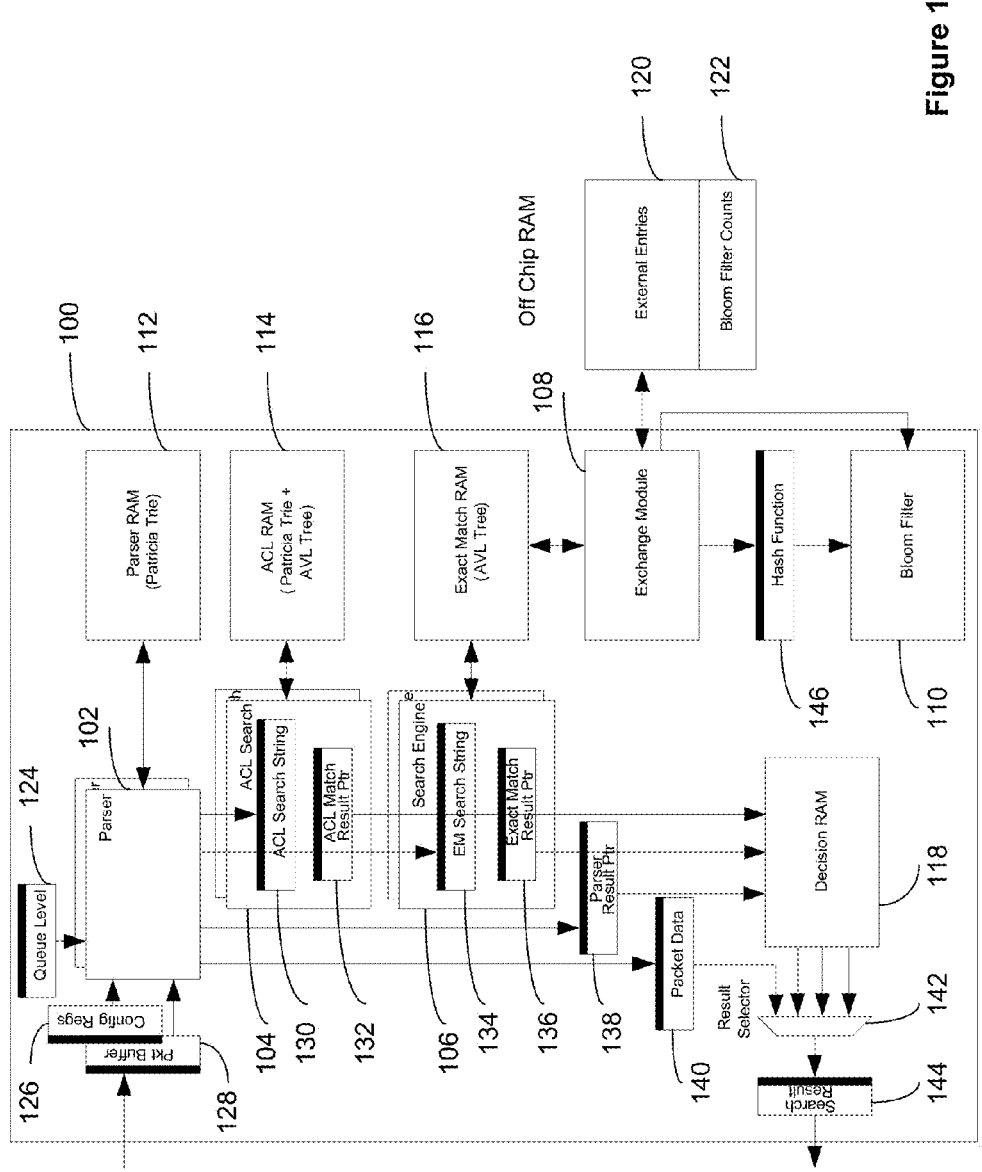
FIG. 1 illustrates a block diagram of a system for maintaining and accessing a data structure according to some aspects of the present disclosure.

FIG. 1 illustrates a block diagram of a data processor according to some aspects of the present disclosure. As shown in FIG. 1, the data processor 100 includes one or more Parser(s) 102, one or more Access Control List (ACL) Search processing block(s) 104, one or more Search Engine(s) 106, Exchange Module 108, and Bloom Filter 110. The data processor 100 further includes a Parser Random Access Memory (RAM) 112 communicatively coupled to the one or more Parser(s) 102, an ACL RAM 114 communicatively coupled to the one or more ACL search processing block(s) 104, an Exact Match RAM 116 communicatively coupled to the one or more Search Engine(s) 106 and to the Exchange Module 108, and a Decision RAM 118. The one or more Parser(s) 102 receives input data from Queue Level block 124, Configuration Register block 126, and Pointer Buffer block 128 configured to receive an input to the data processor 100. The one or more ACL Search processing block(s) 104 includes ACL Search String block 130 and ACL Match Result Pointer block 132. The one or more Search Engine(s) 106 includes Exact Match (EM) Search String block 134 and Exact Match Result Pointer 136. The Decision RAM 118 receives input from ACL Match Result Pointer 132, Exact Match Result Pointer 136, Parser Result Point (from the one or more Parser(s) 102), and produces outputs to Result Selector 142. As a result, the Result Selector 142 receives inputs from Decision RAM 118, and Packet Data block 140 and produces an output to Search Result block 144, which provides a search result output of the data processor 100. The data processor 100 further includes a Hash Function block 146 configured to receive input from the Exchange Module 108 and produce output to the Bloom Filter 110. An Off-chip RAM 120, configured to store external entries of a data structure and Bloom Filter counts, is communicatively coupled to the data processor 100.

According to embodiments of the present disclosure, the one or more Parser(s) read a preconfigured location in an incoming data stream and then compares the contents of the selected bytes with the contents in the preprogrammed Parser RAM 112. Based on the result of the comparison, a first action is taken if the bytes match, and a second action is taken if the bytes do not match. The types of comparisons that can be made can include Equal To, Greater Than or Equal To, Less Than or Equal To, AND with Mask, OR with Mask, Invert Compare, for example. The types of actions that can be taken can include Select the next bytes in the packet to compare, select the next location in the preprogrammed RAM to compare the packet bytes to, extract a portion of the bytes as part of a search string, extract and store the bytes for use in a future search, extract the bytes and perform mathematical operations (Add, Subtract, XOR, etc.) to the extracted bytes and then store the results for a future search, and indicate the current bytes are the last ones that need to be extracted or compared, etc. Note that the extracted bytes are compared to a preprogrammed location in the Parser RAM 112, the preprogrammed location can be reprogrammed with a new set of comparisons and actions if the rules for parsing the incoming stream have been changed. Furthermore, the reprogramming can be done in a manner that a string that is in the midst of being parsed is not interrupted. This allows the rules to be updated without affecting the flow of incoming packets.

Note that the one or more Parser(s) 102 can be configured to extract and add sets of bytes and store the results. With this capability, the data processor 100 can be configured to check in sequence packet reception of contiguous bytes, to maintain statistics for some packet types, or to assign an affinity between the flow and a processor when the first packet for that flow is received based on the current load on all processors.

According to embodiments of the present disclosure, the preprogrammed Parser RAM 112 contents can be arranged to minimize the number of comparisons needed to search for a string. In one implementation, multiple comparisons can be made to the incoming data string by using a wide Parser RAM and having the comparisons made sequentially from left to right. Each set of comparison may include parameters such as string position, mask data, pattern data, and match-action. In this implementation, all but the last comparison specify what the match action is. When a match is found, an action corresponding to that comparison is taken and no further comparisons are made at that location. If additional comparisons of the same incoming data bytes are necessary, a no-match-action can specify that the no-match-action may be to jump to a new Parser RAM address.

FIG. 2 illustrates an exemplary method to parse a data packet according to some aspects of the present disclosure. In this example, the one or more Parsers 102 can be configured to parse a packet and extract the IP Source and Destination Addresses, TCP Source and Destination Ports, and IP TOS field. The first entry in a node indicates a compare operation and the second entry indicates which of the bytes in the parser RAM and the packet are extracted for comparison in the next operation. The parameters passed to the compare operation are the compare string, the mask bits, and which of the bits are extracted to construct the search string to pass to the search engine. The parameters passed to the extract operation are the parser RAM location, node number within that RAM location from which the comparison starts, and the bytes within the packet to compare. For example, the first node in Parser RAM address 0, EQ(0, 0xA0, 0,), J(1, 0, P+2) indicates that the comparison operation is an Equal To, the starting position for the compare is at byte 0 of the packet, the compare string is 0xA0, and none of the bits may be extracted. Similarly, the J(1, 0, P+2) indicates that the next RAM location to compare is located at Address1, Node0, and the packet bytes to compare are located 2 bytes down from the current byte position.

In the example shown in FIG. 2, the first node in Parser RAM Addr1 may be configured to indicate that if the next 2 bytes match A1, increment the packet byte to compare by 2 and jump to the next decision node and branch number to compare. The first node in Parser RAM Addr2 may be configured to indicate that if the next 2 bytes match A2, increment the packet byte to compare to point to the Ethertype and jump to the next decision node and branch number to compare. The first node (leftmost node) in Parser RAM Addr3 may be configured to indicate that if the Ethertype is VLAN, and then increment the packet byte by 4 to point to the next Ethertype field. The second node in Addr3 may be configured to indicate that if the Ethertype is IPv4, and then increment the packet byte by 2 to point to the ToS field. The third node (rightmost node) in Addr3 may be configured to indicate that Ethertype is neither nested VLAN nor IPv4; assume forwarding based on MAC Destination address; and go to Default rule to extract MAC Destination address. The third node (rightmost node) in Parser RAM Addr4 may be configured to indicate that if protocol is not TCP, then assume forwarding based on MAC Destination address; and go to Default rule to extract MAC Destination address. The nodes in Parser RAM Addr5 may be configured to indicate that extracting the IP Source Address and IP Destination Address; then jump back to examine the IP Header Length field to find the location of the TCP Header. The nodes in the Parser RAM Addr6 may be configured to indicate that parallel case statement for different IP Header Lengths to find TCP Source Port Number. The first node of Parser RAM Addr7 may be configured to indicate extract TCP Source Port Number, and the second node of Parser RAM Addr7 may be configured to indicate extract TCP Destination Port Number; then point to a Key Node as the 5-tuple has been assembled.

Figure 3:
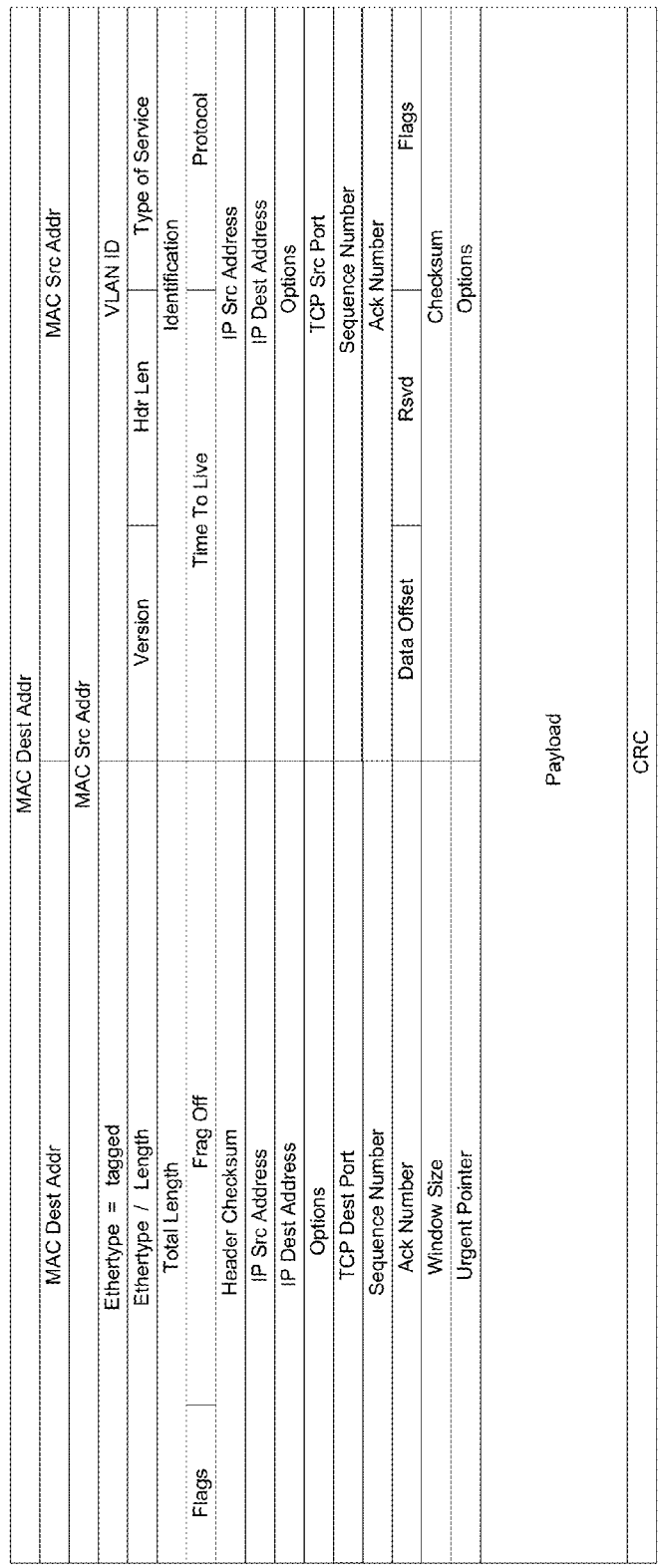
FIG. 3 illustrates an exemplary Ethernet packet according to some aspects of the present disclosure.

FIG. 3 illustrates an exemplary Ethernet packet to be parsed according to some aspects of the present disclosure. According to embodiments of the present disclosure, the parser can pass forward a default pointer to an associative data location that is used along with pointers acquired from the results of the exact match and wildcard match stages. These pointers also pass forward a priority that can be used to determine how the associative data read from the three pointers is used. For example, if the priority of the data associated with the parser pointer is higher than the priority associated with the exact match pointer, then that packet can be filtered, or if the priority is the same then the that packet can be policed, and if the priority is lower, the packet can be forwarded. Additionally, the three associative data can be combined to indicate which queue or set of queues the packet can be forwarded to.

Figure 4:
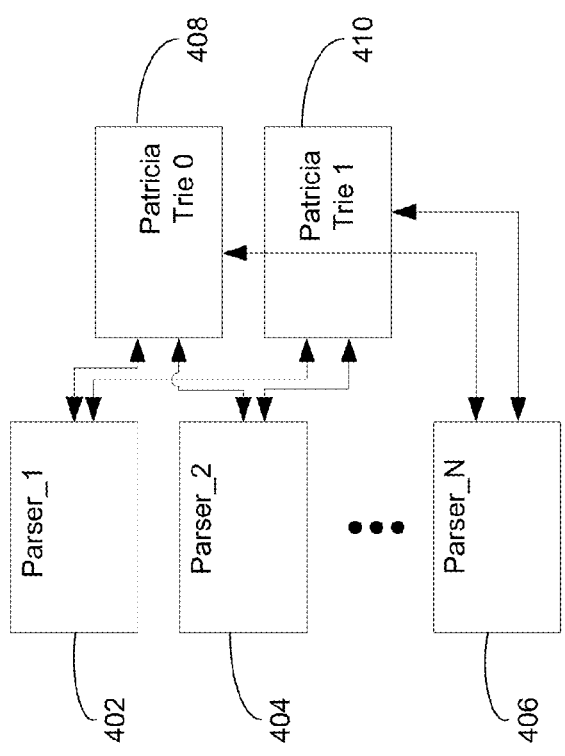
FIG. 4 illustrates an exemplary implementation of a parser block of FIG. 1 according to some aspects of the present disclosure.

FIG. 4 illustrates an exemplary implementation of the one or more Parser(s) of FIG. 1 according to some aspects of the present disclosure. In this example, Parser_0 402, Parser_1 404, and Parser_N 406 are coupled to Patricia Trie0 408 and Patricia Trie1 410.

As shown in FIG. 4, the parser stage can be divided into multiple RAM segments such that the number of cycles required to search for a string per packet from a particular RAM can be bounded to a maximum required by the system. In addition, since the parser design may consist of multiple steps—read the packet location, read the RAM location, compare the two, determine the next step, etc., each of these steps can be assigned a separate clock cycle, and other parsers can be interleaved with the existing parser in order to maximize the parser utilization. For example, if the parser steps are divided into three cycles, then one parser stage can read the packet contents while the second parser stage reads the pre-programmed RAM contents while the third parser stage compares the data.

Figure 5:
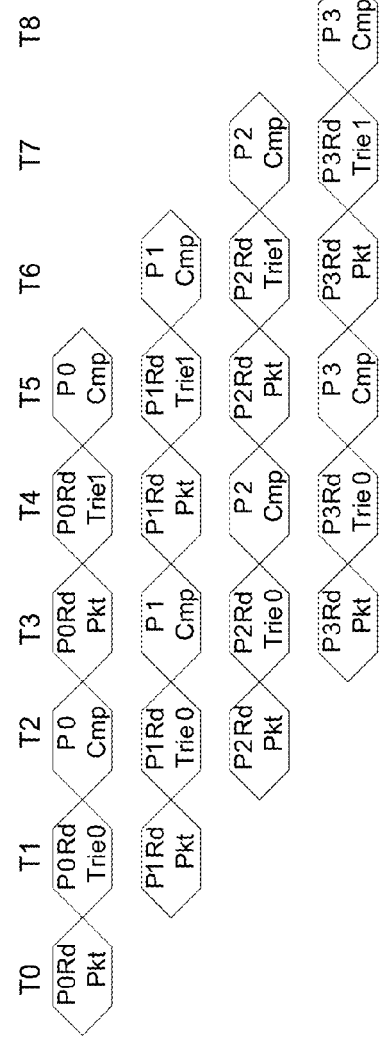
FIG. 5 illustrates a stage interleaving implementation according to some aspects of the present disclosure.

FIG. 5 illustrates a parser stage interleaving implementation according to some aspects of the present disclosure. In the example shown in FIG. 5, four Parsers, namely Parser 0, Parser 1, Parser 2, and Parser 3 are configured to handle operations of 1) read a packet, 2) retrieve preprogrammed RAM contents from a Trie, and 3) perform a comparison of data received in step 1 and step 2. In this example, in period T0, Parser 0 reads a first packet. In period T1, Parser 0 retrieves data from Trie0, Parser 1 reads a second packet. In period T2, Parser 0 compares the first packet with data from Trie0, Parser 1 retrieves data from Trie0, and Parser 2 reads a third packet. In period T3, Parser 0 reads a fifth packet, Parser 1 compares the second packet with data from Trie0, Parser 2 retrieves data from Trie0, and Parser 3 reads a fourth packet. In period T4, Parser 0 retrieves data from Trie1, Parser 1 reads a sixth packet, Parser 2 compares the third packet with data from Trie0, and Parser 3 retrieves data from Trie0. In period T5, Parser 0 compares the fifth packet with data from Trie1, Parser 1 retrieves data from Trie1, Parser 2 reads a seventh packet, and Parser 3 compares the fourth packet with data from Trie0. In period T6, assuming there is no more packet to be processed by Parser 0, Parser 1 compares the sixth packet with data from Trie1, Parser 2 retrieves data from Trie1, and Parser 3 reads an eighth packet. In period T7, assuming there is no more packet to be processed by Parser 0 and Parser 1, Parser 2 compares the seventh packet with data from Trie1, and Parser 3 retrieves data from Trie1. In period T8, assuming there is no more packets to be processed by Parser 0, Parser 1, and Parser 2, Parser 3 compares the eighth packet with data from Trie1. In this example, with parser stage interleaving, it takes about nine cycles to process eight incoming packets with four Parsers working in parallel, which improves performance of processing data packets according to some aspects of the present disclosure.

In some applications, packets may be processed and forwarded in the same order that they are received. If an interleaved approach is used, it is possible that the packets may be reordered if one of the packets requires fewer traversals than the other. To ensure in order forwarding for applications that require it, the parser engine implements a reorder buffer that forwards the results in the same order that they are received, regardless of which parser instance finished the parsing process first.

According to embodiments of the present disclosure, the parser can be configured to specify two search strings—one that is forwarded to the exact match search engine for flow identification and one that is forwarded to the ACL search engine. This feature is useful for applications where the wildcard matches are used for ACLs, and the ACLs are based on fields that do not need to be part of the search string. For example an ACL may be specified for packets with the SYN flag set, but this flag does not need to be part of the search string.

Another part of the data processor includes the search stage. This stage takes the search strings assembled as the result of the parser stage and sends the strings to the exact match search engine and the ACL search engine. According to embodiments of the present disclosure, the exact match search engine may be configured to perform a search of a hierarchical data structure that is bounded in terms of the number of accesses needed to make the search in O(log 2n) accesses, where n is the maximum number of entries stored in the search engine data structure. In one approach, the hierarchical data structure includes a hierarchically arranged set of nodes and branches, and each node has two or less branches. This hierarchical data structure has the advantage of fast add and delete times.

Figure 6A:
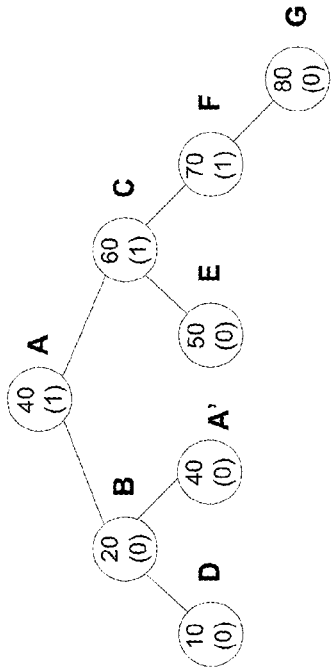
FIGS. 6a-6d illustrate methods of updating a data structure according to some aspects of the present disclosure.

FIG. 6a shows an example of the hierarchical data structure that has 7 nodes, namely nodes A, B, C, D, E, F, and G. Each node includes a sorted value of the node, which is assigned by the search engine. In this example, the assigned value for nodes A, B, C, D, E, F, and G are 40, 20, 60, 10, 50, 70, and 80, respectively. Note that the hierarchical data structure requires that with respect to each node, values that are less than the value of the node be placed to the left side of the node. For example, nodes B and D are placed to the left of node A. Also, the hierarchical data structure requires that with respect to each node, values that are larger than the value of the node be placed to the right side of the node. Thus, nodes C, E, F, and G are placed to the right of node A.

The value in the parenthesis of a node is showing the difference in number of levels between the left side of the node and the right side of the node. A value of +1 is shown when the right side is heavier than the left side by one level; a value of −1 is shown when the left side is heavier than the right side by one level; and a value of 0 is shown when the left side and the right side have the same number of levels. For example, node A has a value of (1) because its right side is one level heavier than its left side. Node B has a value of (−1) because its left side is one level heavier than its right side. Node E has a value of (0) because its left side and its right side have equal number of levels (in this case both sides are empty). A node is considered balanced if the difference in depth of the data structure is 1 or less on one side than on the other side.

A binary sorted tree would have required a worst case search of 3 accesses. However, the hierarchical data structure in this example shows how it could require a worst case search time of 4 accesses and yet be a balanced hierarchical data structure. The disclosed method outlines a technique that can be used to detect when the hierarchical data structure is about to exceed the maximum number of accesses required to meet the desired performance and rebalances the hierarchical data structure so that this number of accesses is retained. The disclosed technique detects this situation in an efficient manner and rebalances the tree with minimal changes, thus maintaining the benefits of the fast add and delete times of the hierarchical data structure while meeting the number of accesses limit. In another approach, the hierarchical data structure may be implemented with an AVL tree, and the methods described below can be applicable to the AVL tree.

Whether the hierarchical data structure requires more accesses than required can be detected by keeping track of the number of nodes in the tree, and the worst case number of accesses required for the search. If this number exceeds the maximum allowed to meet the performance requirements of the search engine, then the tree needs to be rebalanced. The number of nodes will cross the threshold of being at the allowed number of accesses to exceeding it only when a new node is added to the tree, since an add is always done to a leaf node in the hierarchical data structure, the disclosed approach counts the number of nodes visited from the first node to the leaf node so it can detect when a rebalancing is necessary to meet the performance requirements.

The rebalancing can be started from the node that exceeded the allowable accesses and working up the tree towards the first node. At every node, if the number of downstream nodes is more than the minimum required, then the tree rooted from that node needs to be rebalanced. The minimum depth required from a node for a given number of nodes m is roundup (log 2(m+1)).

FIGS. 6a-6d illustrate methods of updating a data structure according to some aspects of the present disclosure. By keeping a count of the total number of nodes of the hierarchical data structure whenever a node is added or deleted and by keeping track of the number of level traversed before adding a new node, the method can detect that in the example of FIG. 6a that a fourth level is added even though there are totally only 7 nodes (i.e. could be able to represent 7 nodes with three levels). Then the methods can determine that adding node G may have exceeded a predetermined performance requirement and a rebalance of the hierarchical data structure may be required.

Note that the rule to decide where to add a particular entry is as follows. When a node with a particular encoding (value 80) need to be added, the method first start at the first node (node A in this example) and do a compare, to determine whether the value of the node to be added is greater than or less than the value of the first node, if it is greater than the first node, than it goes to the right side of the first node; if the value of the node to be added is less than the first node, it goes to left side of the first node. Then, the method performs a similar comparison and decision at each of the subsequent nodes. In this example, the method determines that node G would be added to the right side of node C; and it further determines that node G would be added to the right side of node F.

As shown in FIG. 6a, if node G was the node added, then the hierarchical data structure has 7 nodes. If the performance required only allows for a hierarchical data structure depth of 3, then a rebalancing is required, since the number of accesses to node G is 4. Working backwards from node G, the disclosed approach determines that node F does not need rebalancing since it has 1 leaf node and itself, and therefore requires a depth of 2; node C does not require rebalancing since it has 3 leaf nodes and itself, and therefore requires a depth of 3; and node A needs rebalancing because it has 6 leaf nodes and itself, and therefore may only require a depth of 3, but actually has a depth of 4. In this case, it can be shown that the node that becomes the new first node is the one that is either the next higher or next lower value than the current first node. This is because removing a node from the branch that has the longest depth can cause that branch to be rebalanced so that its depth decreases by one. For the example shown in FIG. 6a, since node G was added to the right branch of node A, then the new first node will be node E, which has the next higher value then the value at node A. The next higher value from a node can always be found at the leftmost node in the right branch from that node (i.e. node E is the leftmost node in the right branch of node A), and the next lower value from a node can always be found at the rightmost node in the left branch from that node (in this case, node B is the rightmost node in the left branch of node A).

Figure 6B:
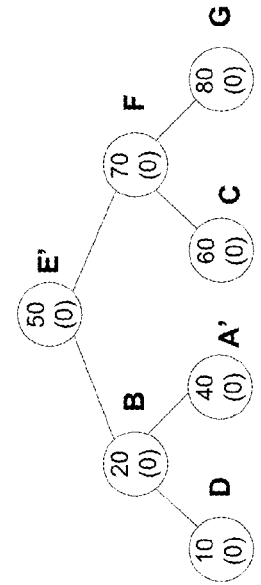
Figure 6C:
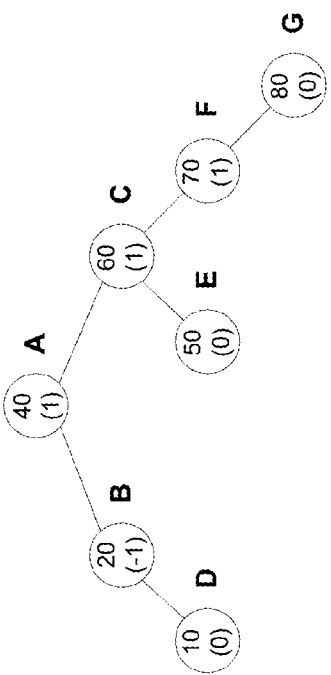
Figure 6D:
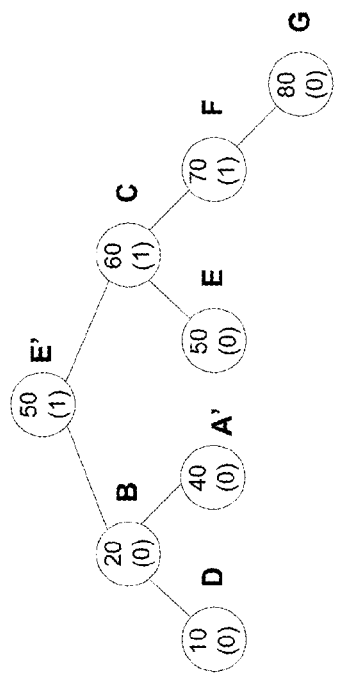

In one implementation, the rebalancing process can be done by first adding a duplicate of the first node to the side of the branch that does not have the longest depth. In the example shown in FIG. 6a, a duplicate of node A, node A', would be added to the left branch, as shown in FIG. 6b. After node A' has been added, the first node A can be replaced with a copy of the next higher node to the right of node A, which is node E' as shown in FIG. 6c. After node E' has been added as the new first node, the original node E can be removed from the hierarchical data structure. Thus resulting in a hierarchical data structure as shown in FIG. 6d that meets a predetermined level of performance requirements.

The process of rebalancing the hierarchical data structure in order to reduce its depth can be done in a manner where all nodes in the data structure can be found by a search process even when rebalancing is in progress. This capability is implemented to insure that the incoming data processing is not halted and can continue to meet its performance requirements while the tree is being rebalanced. In one approach, the method of rebalancing the data structure as described in FIGS. 6a-6d includes retrieving a first data entry in the data structure via node A in response to a first data access request, modifying the data structure to generate a first intermediate data structure (as shown in FIG. 6b) that keeps the node A and creates a duplicate of node A (node A'), and retrieving a second data entry in the data structure via node A' in response to a second data access request. The method further includes retrieving a third data entry in the data structure via node E in response to a third data access request, modifying the first intermediate data structure to generate a second intermediate data structure (as shown in FIG. 6c) that creates a duplicate of node E (node E') and replaces node A with node E', and retrieving a fourth data entry in the data structure via node E' in response to a fourth data access request. The method further includes modifying the second intermediate data structure (as shown in FIG. 6c) to generate an updated data structure (as shown in FIG. 6d) that removes node E and balances the data structure with respect to node E', and storing the updated data structure in a memory.

FIGS. 7a-7d illustrate methods of updating a data structure according to some aspects of the present disclosure. The properties of the hierarchical data structure shown in FIGS. 7a-7d are substantially similar to that of FIGS. 6a-6d. In this series of Figures, node G having a value of 45 is added to the left branch of node E in the hierarchical data structure, which causes an imbalance in the right side of the hierarchical data structure, and thus a rebalancing is triggered. The new first node will be node G, since it has the next higher value on the right side of the first node A (i.e. node G is the leftmost node in the right branch of node A).

Figure 7B:
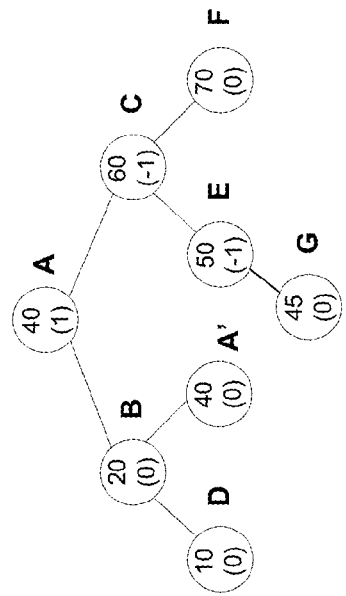
FIGS. 7a-7d illustrate methods of updating a data structure according to some aspects of the present disclosure.
Figure 7D:
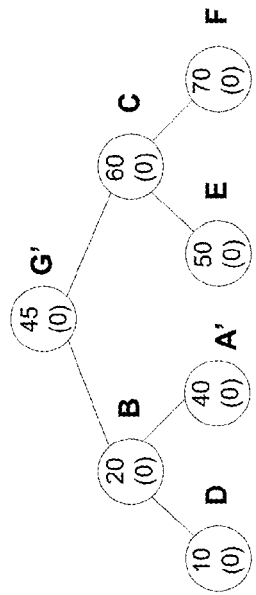
Figure 7A:
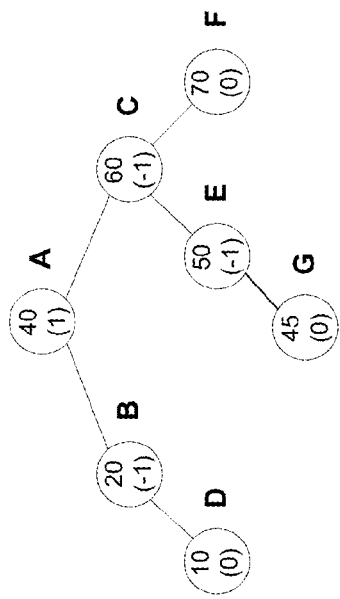
Figure 7C:
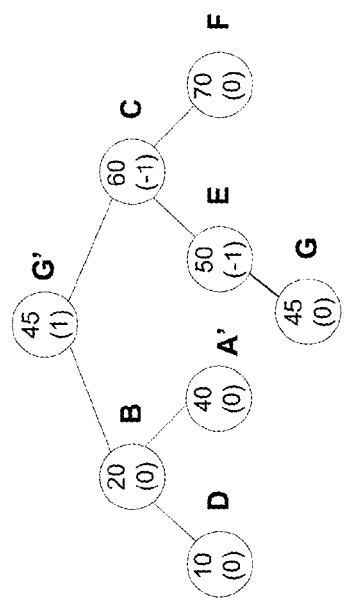

In one implementation, the rebalancing process can be done by first adding a duplicate of the first node to the side of the branch that does not have the longest depth. In the example shown in FIG. 7a, a duplicate of node A, node A', would be added to the left branch, as shown in FIG. 7b. After node A' has been added, the first node A can be replaced with a copy of the next higher node to the right of node A, which is node G' as shown in FIG. 7c. After node G' has been added as the new first node, the original node G can be removed from the hierarchical data structure. Thus resulting in a hierarchical data structure as shown in FIG. 7d that meets a predetermined level of performance requirements.

The process of rebalancing the hierarchical data structure in order to reduce its depth can be done in a manner where all nodes in the data structure can be found by a search process even when rebalancing is in progress. This capability is implemented to insure that the incoming data processing is not halted and can continue to meet its performance requirements while the tree is being rebalanced. In one approach, the method of rebalancing the data structure as described in FIGS. 7a-7d includes retrieving a first data entry in the data structure via node A in response to a first data access request, modifying the data structure to generate a first intermediate data structure (as shown in FIG. 7b) that keeps the node A and creates a duplicate of node A (node A'), and retrieving a second data entry in the data structure via node A' in response to a second data access request. The method further includes retrieving a third data entry in the data structure via node G in response to a third data access request, modifying the first intermediate data structure to generate a second intermediate data structure (as shown in FIG. 7c) that creates a duplicate of node G (node G') and replaces node A with node G', and retrieving a fourth data entry in the data structure via node G' in response to a fourth data access request. The method further includes modifying the second intermediate data structure (as shown in FIG. 7c) to generate an updated data structure (as shown in FIG. 7d) that removes node G and balances the data structure with respect to node G', and storing the updated data structure in a memory.

FIGS. 8a-8d illustrate methods of updating a data structure according to some aspects of the present disclosure. The properties of the hierarchical data structure shown in FIGS. 8a-8d are substantially similar to that of FIGS. 6a-6d. In this series of figures, node G having a value of 5 is added to the left branch of node D in the hierarchical data structure, which causes an imbalance in the left side of the hierarchical data structure, and thus a rebalancing is triggered. The new first node will be node E, since it has the next lower value on the left side of the first node A (i.e. node E is the leftmost node in the left branch of node A).

Figure 8A:
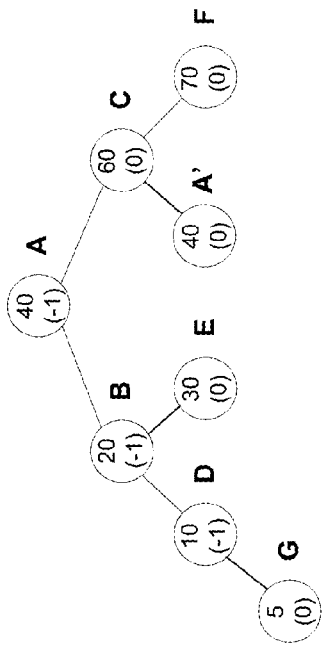
FIGS. 8a-8d illustrate methods of updating a data structure according to some aspects of the present disclosure.
Figure 8B:
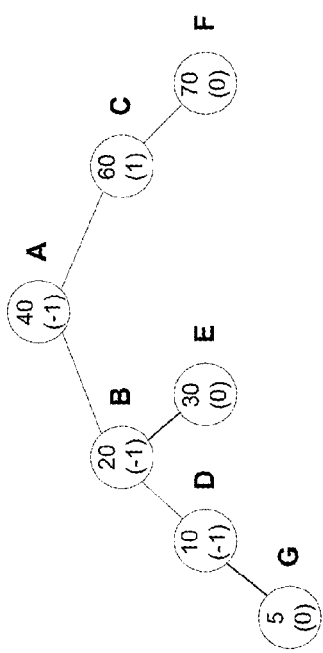
Figure 8C:
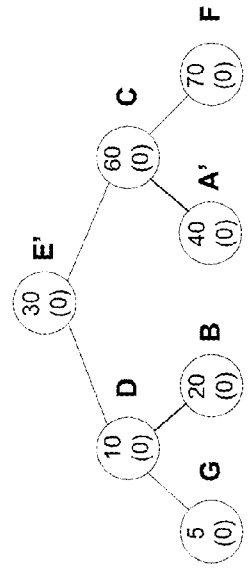
Figure 8D:
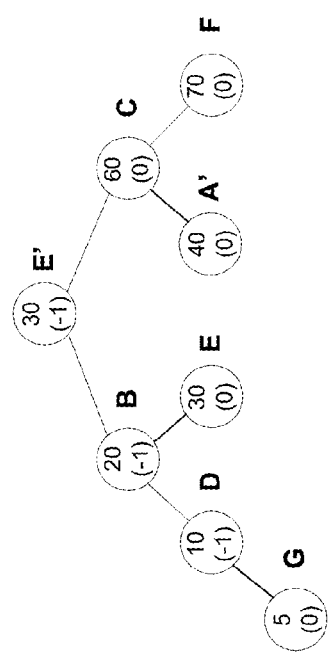

In one implementation, the rebalancing process can be done by first adding a duplicate of the first node to the side of the branch that does not have the longest depth. In the example shown in FIG. 8a, a duplicate of node A, node A', would be added to the right branch of node A, as shown in FIG. 8b. After node A' has been added, the first node A can be replaced with a copy of the next lower node to the left of node A, which is node E' as shown in FIG. 8c. After node E' has been added as the new first node, the original node E can be removed from the hierarchical data structure. Thus resulting in a hierarchical data structure as shown in FIG. 8d that meets a predetermined level of performance requirements.

The process of rebalancing the hierarchical data structure in order to reduce its depth can be done in a manner where all nodes in the data structure can be found by a search process even when rebalancing is in progress. This capability is implemented to insure that the incoming data processing is not halted and can continue to meet its performance requirements while the tree is being rebalanced. In one approach, the method of rebalancing the data structure as described in FIGS. 8a-8d includes retrieving a first data entry in the data structure via node A in response to a first data access request, modifying the data structure to generate a first intermediate data structure (as shown in FIG. 8b) that keeps the node A and creates a duplicate of node A (node A'), and retrieving a second data entry in the data structure via node A' in response to a second data access request. The method further includes retrieving a third data entry in the data structure via node E in response to a third data access request, modifying the first intermediate data structure to generate a second intermediate data structure (as shown in FIG. 8c) that creates a duplicate of node E (node E') and replaces node A with node E', and retrieving a fourth data entry in the data structure via node E' in response to a fourth data access request. The method further includes modifying the second intermediate data structure (as shown in FIG. 8c) to generate an updated data structure (as shown in FIG. 8d) that removes node E and balances the data structure with respect to node E', and storing the updated data structure in a memory.

Note that in the examples shown above in association with FIGS. 6a-6d, 7a-7d, and 8a-8d, for simplicity of illustration, only data structures with seven nodes are shown. In real life applications, a hierarchical data structure may have thousands or millions of nodes. The small data structure of seven nodes shown in the examples may be a part of a larger data structure. In addition, a part of a larger data structure may include different number of nodes, such as 7, 125, and 508, which can vary based on the different applications.

Figure 9:
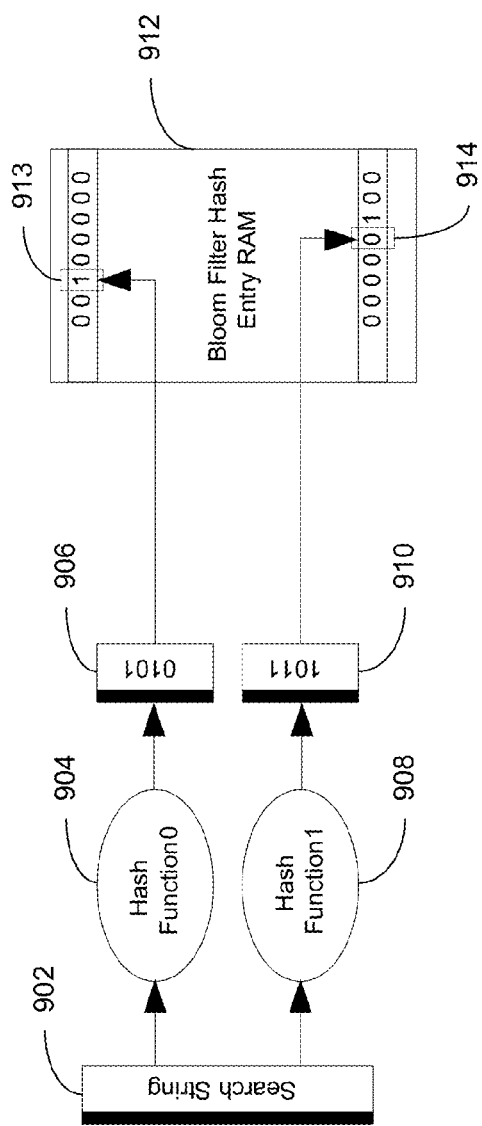
FIG. 9 illustrates an exemplary Bloom Filter according to some aspects of the present disclosure.

FIG. 9 illustrates an exemplary Bloom Filter according to some aspects of the present disclosure. As shown in FIG. 9, the exemplary Bloom Filter includes an input search string 902, a first hash function 904, a first hash entry 906 generated by the first hash function, a second hash function 908, a second hash entry 910 generated by the second hash function, a Bloom Filter hash entry RAM 912. In this example, the first hash entry 906 points to a first bit 913 in the Bloom Filter hash entry RAM 912, and the second hash function points to a second bit 914 in the Bloom Filter hash entry RAM 912.

The search engine can be optimized for both small as well as large number of entries. For a data structure with a small number of entries, all the entries may be located in an on chip RAM. However, as the number of entries increases, it becomes necessary that a portion of the entries be kept on chip and the remainder be maintained off chip. The entries that are kept on chip are the ones that have been accessed recently. They are kept on chip because the amount of time taken to access an entry that is located on chip is usually much smaller than the amount of time taken to access an entry located off chip. This implementation exploits the information of temporal locality, which means an entry that has been recently accessed is more likely to be accessed again, whereas an entry that has not been accessed recently is less likely to be accessed. The use of temporal locality is well suited for networking applications as most networking protocols send packets in bursts and then remain idle while waiting for the remote end to acknowledge reception of the previously sent packets. Thus, even if an entry is initially located off chip and results in an access to the off chip RAM subsequent accesses to that same entry can result in a shorter search time if that entry is loaded on chip after the first access.

The disclosed method utilizes a caching engine called the Exchange Module that automatically loads an off chip entry into the on chip RAM. The Exchange module determines which of the on chip entries can be moved off chip in case there is no space in the on chip RAM for the entry that is being moved on chip. The Exchange Module uses a pseudo Least Recently Used (LRU) algorithm to determine which of the on chip entries to move off chip. It provides the ability to mark some entries as Locked so that they are not to be moved off chip and are kept on chip. This feature provides the ability for some critical entries to be retained on chip so they would not experience the miss latency.

When a caching methodology is employed and a some number of entries are kept on chip and the remainder entries are kept off chip, one way to determine whether a particular entry is located in the data structure is to search for it in both the on chip RAM, and if it is not found, to search for it in the off chip RAM as well. This means that whenever an entry that is not located in the data structure at all is received, it always results in an access to the off chip RAM. This is undesirable since the access time to the off chip RAM is generally much longer than the rate at which packets can be received. In order to reduce the number of accesses required to the off chip RAM for cases when the entry does not exist in the data structure, as well as find the location at which the entry is located in the off chip RAM, the Exchange Module employs a Counting Bloom Filter.

According to embodiments of the present disclosure, a Bloom Filter is an area efficient method of determining with a high degree of probability whether a particular entry is likely to exist in a data structure or not. The Bloom Filter utilizes hash functions to find hash entries that are then used to index into the Bloom Filter RAM. If the hashed entry exists in the Bloom Filter RAM, then the corresponding entry either exists in the data structure, or with a small probability, the entry may not exist in the data structure. However, if a hashed entry does not exist in the Bloom Filter, then that entry definitely does not exist in the data structure. Thus, the Bloom Filter reduces the number of times that the off chip RAM needs to be accessed when particular encodings are received that do not exist in the data structure. The probability with which the false positives occur in the Bloom Filter can be managed based on the number of total entries that exist in the data structure, the number of RAM bits utilized by the Bloom Filter, and the number of hash functions used to index into the Bloom Filter. For example, if the number of entries supported in the off chip RAM is 1 million, then a Bloom Filter that utilizes 3 hash functions and implements approximately 4.8 million bits can predict with a 10% false positive rate whether a particular entry resides in the off chip RAM or not. This means that the number of accesses to off chip RAM when entries that do not exist in the data structure are received can be reduced by 90% by using this particular configuration of Bloom Filter.

When the disclosed method is used in a device that has a small number of entries, the Bloom Filter is not needed, and therefore the Bloom Filter RAM is reused for storing additional on chip entries. This allows for an efficient classifier design that works well for both designs where the number of entries is large as well as when the number of entries is small. Additionally, the disclosed method has an added benefit of being able to dynamically adjust from on chip to a split of on and off chip entry storage based on the actual operating state of a device.

For the cases of false positives that do result from the Bloom Filter, the disclosed method further reduces the number of off chip RAM accesses by creating a default miss entry for the particular encoding that caused the false positive. Based on the information of temporal locality, that same encoding is likely to occur again in time proximity of the first occurrence, so creating a default miss entry in the on chip RAM for the encoding that does not exist in the data structure reduces the number of off chip accesses required for that encoding.

The disclosed method provides a mechanism for limiting the number of non-existing entries that have a default miss entry created in the on chip data structure in order to limit the effect of the non-existent entries on legitimate entries that do exist in the data structure. If the number and rate of non-existing entries being received exceeds this programmable threshold, then the Exchange Module can be configured to inform an external logic of this occurrence by generating an interrupt. The external logic can then take additional steps to handle this situation by either creating ACL entries for the pattern of non-existing entries that are causing the false positives, or by reconfiguring the Bloom Filter so that these false positives are detected as not existing, or by programming the parser stage to control the rate of the non-existing entries.

The Bloom Filter can be efficient when hash entries are added to the Filter, but may not be as efficient when entries are removed. This is because multiple entries may have hash entries that map to the same locations in the Bloom Filter RAM, so removing the bits that map to a particular Bloom Filter location may result in other valid entries also being removed. Consider the case where a particular search string A results in two hashes X and Y, and another search string B results in two hashes Y and Z. If search string A is now removed from the data structure, and the corresponding hash encodings X and Y are removed from the Bloom Filter RAM, then search string B will result in a mismatch since the bit associated with hash encoding Y was removed from the data structure. Furthermore, if the hash function employed is one in which it is not possible to determine which entry resulted in that particular hash, these entries need to be examined and have their hashes calculated in order to determine whether a particular hash has more than one entry mapping to it.

Figure 10:
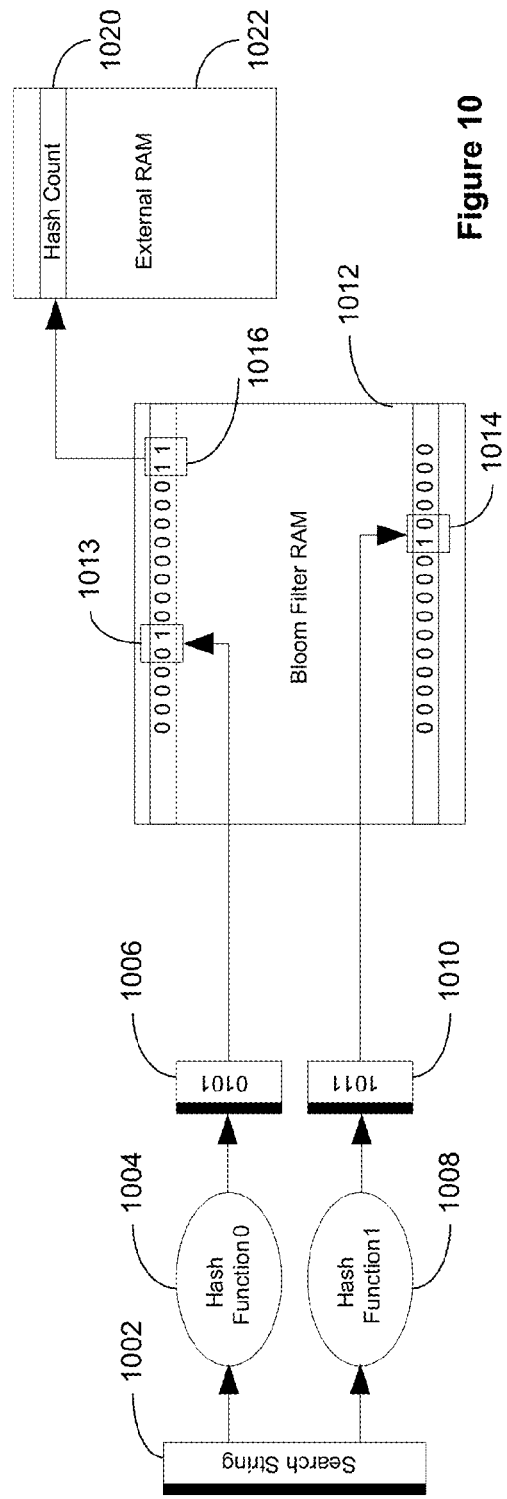
FIG. 10 illustrates an exemplary counting Bloom Filter according to some aspects of the present disclosure.

The disclosed method resolves this problem by employing a Counting Bloom Filter, in which each location in the Bloom Filter also keeps track of the number of encodings that map to the same location. FIG. 10 illustrates an exemplary counting bloom filter according to some aspects of the present disclosure. The exemplary counting bloom filter includes an input search string 1002, a first hash function 1004, a first hash entry 1006 generated by the first hash function, a second hash function 1008, a second hash entry 1010 generated by the second hash function, a bloom filter RAM 1012.

Note that a two-bit counter is chosen for this particular implementation. A value of 00 indicates there is no entry in the data structure that matches the hash value; a value of 01 indicates there is one entry in the data structure that matches the hash value; a value of 10 indicates there are two entries in the data structure that matches the hash value; and a value of 11 indicates there are more than two entries in the data structure that matches the hash value. In the case of count value of 11, an additional table can be stored in an external memory to store the count of number of entries in the data structure that matches the hash value.

In other implementations, a counter of different number of bits may be selected, such as 3, 4, 8, or other number of bits. It is a design tradeoff to balance the use of valuable on-chip memory to store a larger counter for each entry versus the performance tradeoff in accessing the count values for a group of entries in the data structure. Note that in the approach shown in FIG. 10, it manages to keep the size of on-chip data structure small while taking care of the situations of multiple aliasing by keeping a value of Bloom Filter, and addressing the issue of large number of aliasing with a table of external count values. This approach takes care of data searches, which are most frequently occurred cases. In many applications, adding or deleting data entries do not happen as often as searches. With this implementation, it has maintained high efficiency for searches with a relatively small data structure of Bloom Filter, and only have to modify the count values with adds and deletes of entries in the data structure.

In this example, the first hash entry 1006 points to a first set of bits "01" (represented by numeral 1013) in the bloom filter RAM 1012 that indicates one entry in the data structure has the hash value "0101". Similarly, the second hash function points to a second set of bits "10" (represented by numeral 1014) in the bloom filter RAM 1012 that indicates there are two entries in the data structure that has the hash value "1011". In the case of a set of bits 1016 has a value of "11", which indicates two or more entries in the data structure having the same hash value. In that case, a hash count 1020 is stored in an external RAM 1022, and the hash count indicates the actual number of entries in the data structure that have the hash value.

In one implementation, when an entry is being removed from the Bloom Filter, the control logic checks for the number of encodings that mapped to that same location, and decrements the number from the count of the Bloom Filter. One approach to reduce the overhead associated with keeping a count per location in the Bloom Filter is to maintain the actual count in the off chip RAM, and implements an additional bit per location that indicates whether the count is 0, 1, 2, or more than 2. However, this is just an implementation tradeoff, and the same idea can be used with just a single on chip bit per location or a second bit per group of locations. In the two bits per location implementation, this reduces the number of accesses to the off chip RAM to only those cases where a Bloom Filter location has more than two entries mapped to it, yet reduces the number of bits maintained on chip for the Counting Bloom Filter. Since adds and deletes from the data structure are not as frequent as searches, the extra external RAM access required to update the hash entry count when there are more than 2 strings that have the same hash entry encoding is an acceptable tradeoff.

The ACL match search engine reuses sections of the parser stage and the exact match search engine to support entries in which some sections of the search string are don't care. It utilizes the Patricia Trie approach of the parser stage in order to break the search string into smaller components, and the mask and compare capability to mask out those bits of the incoming string that may be don't care for a particular entry. If multiple entries have collisions on the same bit pattern, then these entries are sorted using an AVL tree approach of the exact match stage. If at a later stage it is found that the wrong branch was taken because subsequent bytes mismatched between the search string and the programmed entry, then the search can jump back to the next candidate that matched. This reduces the number of backtracking steps needed when multiple entries collide.

When the number of entries that collide is large and the worst case time taken to search through all the colliding entries exceeds the allowable limit of the system, this method inherently supports reordering the order in which the search string bytes are divided and compared so that the entries can be reprogrammed to reduce the number of collisions. Every time an entry is added to the ACL entry table, this method examines the table to determine whether the worst case search time is approaching the allowable limit for the system, and if it has reached this limit, this method calculates the order of processing that leads to the least amount of collisions and reprograms the table accordingly. This capability, along with the ability to interleave multiple search stages, and the ability to further partition the exact match and ACL match engines into multiple stages, results in a highly flexible and reconfigurable classifier design that works efficiently for large as well as small data structures. Furthermore, the ability to partition the engines into multiple stages allows the disclosed method to support high packet processing rates.

FIG. 11 illustrates exemplary rules containing wildcards according to some aspects of the present disclosure. In this example, the condition of String0 and SubStrZ (1102) is a don't care, the condition of String1 and SubStrY (1104) is a don't care, the condition of String2 and SubStrW (1106) is a don't care, the condition of String2 and SubStrX (1108) is a don't care, and the condition of String2 and SubStrY (1110) is a don't care. These are examples of rules that contain wildcards.

FIG. 12 illustrates exemplary wildcard search entries using rules of FIG. 11 according to some aspects of the present disclosure. In this example, the first entry of Addr0 (1201) indicates that starting at SubStrW, if it matches 0x00, then jump to RAM Address 1 to check for SubStrX. If it doesn't match, then jump to RAM Address 3 to check for SubStrZ. The second entry of Addr0 (1202) indicates that if SubStrW does not match 0x00 then jump to RAM Address 3 to check for SubStrZ as the rule it could match is String2. The first entry of Addr1 (1203) indicates that if SubStrX matches 0x20, then jump to RAM Address 3 Node 2 to check for SubStrZ. The second entry of Addr1 (1204) indicates that if SubStrX matches 0x10, then jump to RAM Address 2 Node 0 to check for SubStrY. The third entry of Addr1 (1205) indicates that if SubStrX matches 0x30, then jump to RAM Address 2 Node 2 to check for SubStrY. The fourth entry of Addr1 (1206) indicates that if SubStrX does not match any, then jump to RAM Address 3 Node 0 to check for SubStrZ. The first entry of Addr2 (1207) indicates that if SubStrY matches 0x20, then jump to RAM Address 4 Node 2 as this matches String2. The third entry of Addr2 (1208) indicates that if SubStrY matches 0x20, then jump to RAM Address 3 to check for SubStrZ. The first entry of Addr3 (1209) indicates that if SubStrZ matches 0x30, then jump to RAM Address 4 Node 2 as this matches String2. The third entry of Addr3 (1210) indicates that if SubStrZ matches 0x30, then jump to RAM Address 4 Node 1 as this matches String1. The fifth entry of Addr3 (1212) indicates that if SubStrZ matches 0x30, then jump to RAM Address 4 Node 3 as this matches String3.

The present disclosure is useful in applications that require the ability to search through a series of bytes in order to find a pattern that matches with a preprogrammed table of entries. It can be used as a header lookup engine in packet switched networks, as part of a deep packet inspection block in intrusion detection and prevention system as well as a virus detection system. Some components of this design can be used as generic blocks within other designs that require the ability to move entries on and off chip efficiently.

This present disclosure describes methods to efficiently parse packets in order to select certain fields and use them to search for data associated with those fields. The present disclosure further describes mechanisms that provide flexibility and upgradability in the parse and search methodologies.

This present disclosure further solves two parts of a packet processing problem. The first is to parse the packet in order to locate and extract the fields based on which associative data is searched. The second is to search through a set of elements in order to find the associative data corresponding to the extracted fields. It provides full flexibility in both parts, which makes it ideally suited for applications where there are a number of different packet types and formats, as well as applications where there is a need to modify the parsing capability when new packet header formats are defined. Its configurability and re-programmability allow the same hardware to be used to support different interface and packet types by re-programming the hardware. It also provides an architecture where it can efficiently search through small as well as large data structures of enumerations while minimizing the area and power impact to the network processor.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The disclosure can be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. A method for updating a data structure, comprising:
providing a data structure, wherein the data structure comprises a hierarchically arranged set of nodes and branches, and each node has two or less branches;
retrieving a first data entry in the data structure via a first node in response to a first data access request;
modifying the data structure to generate a first intermediate data structure that keeps the first node and creates a duplicate of the first node, wherein the first intermediate data structure comprises the first node and the duplicate of the first node;
retrieving a second data entry in the data structure via the duplicate of the first node in response to a second data access request;
retrieving a third data entry in the data structure via a second node in response to a third data access request; and
modifying the first intermediate data structure to generate a second intermediate data structure that creates a duplicate of the second node and removes the first node by replacing the first node with the duplicate of the second node.

2. The method of claim 1 further comprises:
retrieving a fourth data entry in the data structure via the duplicate of the second node in response to a fourth data access request.

3. The method of claim 2 further comprises:
modifying the second intermediate data structure to generate an updated data structure, wherein the updated data structure removes the second node and balances the data structure with respect to the duplicate of the second node; and
storing the updated data structure in a memory.

4. The method of claim 1, wherein modifying the data structure comprises:
traversing up the data structure from a leaf node that exceeded a predetermined allowable accesses; and
examining each node to determine the first node to be duplicated.

5. The method of claim 2, wherein modifying the first intermediate data structure comprises:
identifying a second node to replace the first node.

6. The method of claim 5, wherein the second node has a next higher value compared to value of the first node of the data structure if a number of levels to the right of the first node is more than a number of levels to the left of the first node.

7. The method of claim 5, wherein the second node has a next lower value compared to value of the first node of the data structure if a number of levels to the left of the first node is more than a number of levels to the right of the first node.

8. A computer program product for updating a data structure, comprising a non-transitory medium storing computer programs for execution by one or more computer systems, comprising:
code for providing a data structure, wherein the data structure comprises a hierarchically arranged set of nodes and branches, and each node has two or less branches;
code for retrieving a first data entry in the data structure via a first node in response to a first data access request;

code for modifying the data structure to generate a first intermediate data structure that keeps the first node and creates a duplicate of the first node, wherein the first intermediate data structure comprises the first node and the duplicate of the first node;

code for retrieving a second data entry in the data structure via the duplicate of the first node in response to a second data access request;

code for retrieving a third data entry in the data structure via a second node in response to a third data access request; and code for modifying the first intermediate data structure to generate a second intermediate data structure that creates a duplicate of the second node and removes the first node by replacing the first node with the duplicate of the second node.

9. The computer program product of claim 8 further comprises:

code for retrieving a fourth data entry in the data structure via the duplicate of the second node in response to a fourth data access request.

10. The computer program product of claim 9 further comprises:

code for modifying the second intermediate data structure to generate an updated data structure, wherein the updated data structure removes the second node and balances the data structure with respect to the duplicate of the second node; and code for storing the updated data structure in a memory.

11. The computer program product of claim 8, wherein modifying the data structure comprises:

code for traversing up the data structure from a leaf node that exceeded a predetermined allowable accesses; and code for examining each node to determine the first node to be duplicated.

12. The computer program product of claim 9, wherein modifying the first intermediate data structure comprises:

code for identifying a second node to replace the first node.

13. The computer program product of claim 12, wherein the second node has a next higher value compared to value of the first node of the data structure if a number of levels to the right of the first node is more than a number of levels to the left of the first node.

14. The computer program product of claim 12, wherein the second node has a next lower value compared to value of the first node of the data structure if a number of levels to the left of the first node is more than a number of levels to the right of the first node.

15. A system for updating a data structure, comprising:

a memory for storing the data structure, wherein the data structure comprises a hierarchically arranged set of nodes and branches, and each node has two or less branches;

a graphical-user-interface for viewing representations of the data structure on a display;

a search engine includes at least a processor and control logic, wherein the processor and control logic further comprises logic for retrieving a first data entry in the data structure via a first node in response to a first data access request;

logic for modifying the data structure to generate a first intermediate data structure that keeps the first node and creates a duplicate of the first node, wherein the first intermediate data structure comprise the first node and the duplicate of the first node;

logic for retrieving a second data entry in the data structure via the duplicate of the first node in response to a second data access request;

logic for retrieving a third data entry in the data structure via a second node in response to a third data access request; and logic for modifying the first intermediate data structure to generate a second intermediate data structure that creates a duplicate of the second node and removes the first node by replacing the first node with the duplicate of the second node.

16. The system of claim 15 further comprises:

logic for retrieving a fourth data entry in the data structure via the duplicate of the second node in response to a fourth data access request.

17. The system of claim 16 further comprises:

logic for modifying the second intermediate data structure to generate an updated data structure, wherein the updated data structure removes the second node and balances the data structure with respect to the duplicate of the second node; and logic for storing the updated data structure in a memory.

18. The system of claim 15, wherein modifying the data structure comprises:

logic for traversing up the data structure from a leaf node that exceeded a predetermined allowable accesses; and logic for examining each node to determine the first node to be duplicated.

19. The system of claim 16, wherein modifying the first intermediate data structure comprises:

logic for identifying a second node to replace the first node.

20. The system of claim 19, wherein the second node has a next higher value compared to value of the first node of the data structure if a number of levels to the right of the first node is more than a number of levels to the left of the first node.

21. The system of claim 19, wherein the second node has a next lower value compared to value of the first node of the data structure if a number of levels to the left of the first node is more than a number of levels to the right of the first node.

22. The system of claim 15 further comprises:

one or more parsers coupled to a parser RAM, wherein the one or more parsers are configured to read an incoming data stream and compares contents of the incoming data stream with contents in a location of the parser RAM;

one or more access control list (ACL) search engines coupled to an ACL RAM, wherein the one or more ACL search engines are configured to perform searches with ACL search strings; and one or more search engines coupled to an exact match RAM, wherein the one or more search engines are configured to maintain the data structure.

23. The system of claim 22 further comprises:

an exchange module coupled to the exact match RAM and an external memory, wherein the exchange module is configured to control entries of the data structure between the exact match RAM and the external memory;

one or more hash functions configured to generate hash values of data entries in the data structure; and a bloom filter coupled to the one or more hash functions, wherein the bloom filter is configured to determine whether a data entry exists in the data structure.

* * * * *